J. R. RUDE.
Seeding-Machine.
No. 226,355. Patented April 6, 1880.
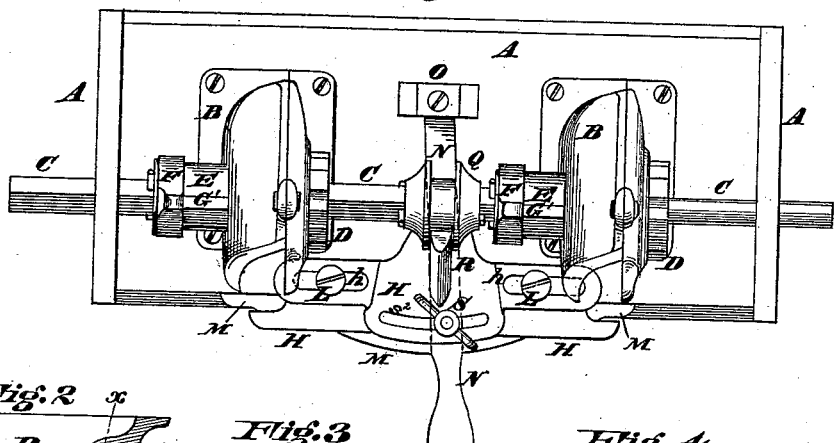
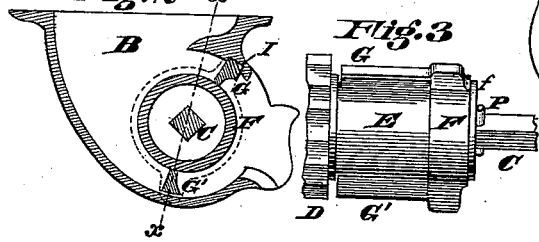
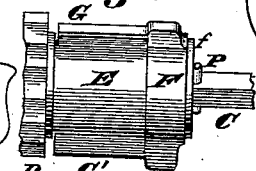
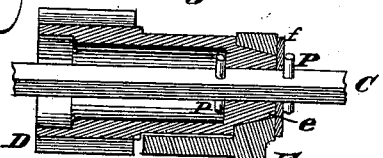
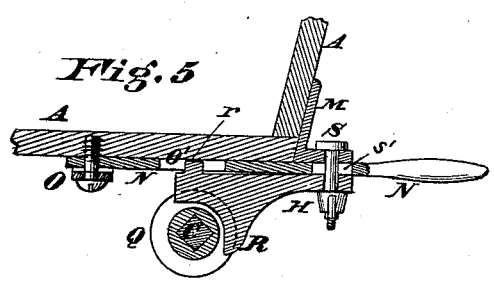
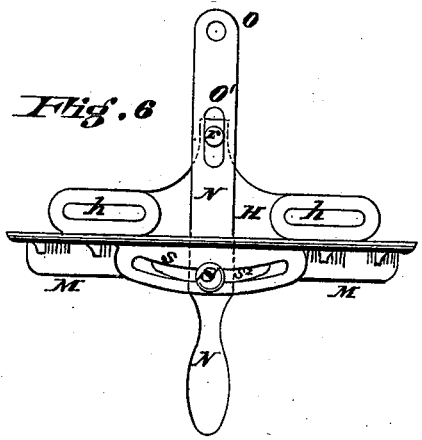
Attest
Jas. E. Jones
S. L. Hockert
Inventor
John R. Rude,
By his Atty's Wood & Boyd

UNITED STATES PATENT OFFICE.

JOHN R. RUDE, OF LIBERTY, INDIANA, ASSIGNOR TO HIMSELF, SQUIRE B. RUDE, AND GEO. W. RUDE.

SEEDING-MACHINE.

SPECIFICATION forming part of Letters Patent No. 226,355, dated April 6, 1880.

Application filed December 26, 1879.

*To all whom it may concern:*

Be it known that I, JOHN R. RUDE, of Liberty, in the county of Union and State of Indiana, have invented certain new and useful Improvements in Seeding-Machines, of which the following is a specification.

My invention relates to an improvement in seeding devices for sowing grain.

The first part of my invention consists in attaching to one end of the seed-wheels revolving cylinders of lesser diameter than the seed-wheels and stationary arms or wings attached to said seed-wheel cylinders, so as to slide laterally with the seed-wheel in suitable seed-cups, which arms or wings act as cut-offs to regulate the size of delivery-opening in the seed-cups, one end of the seed-cup being sustained by a rose-washer and the other by bearings attached to the wings surrounding the cylinder.

The more specific features of my invention will be fully described in the following specification and accompanying drawings.

Referring to the accompanying drawings, Figure 1 is a bottom-plan view, showing my improvements applied to two seed wheels and cups. Fig. 2 is a transverse section on the line of the cups of Fig. 1. Fig. 3 is a longitudinal elevation of the wheel and its parts. Fig. 4 is a longitudinal section on line $x\,x$, Fig. 2. Fig. 5 is a cross-section, showing the adjusting-lever and its attachments; and Fig. 6 is a top-plan view of the same.

A represents a seed-box of an ordinary drill or seeder; B B, seed-cups of the preferred form, and C a shaft on which the wheels are mounted. D D represent ends of seed-wheels, which work in an ordinary rose-washer having bearings for the seed-wheels in the cups, and revolving with the wheels D.

E represents a revolving cylinder attached to the seed-wheel, and of smaller diameter. This revolving cylinder, moving with the wheel, prevents the grain from bridging in the cup when adjusted to cut off part of the grain-channel through the cup and to narrow the delivery-orifice. The cylinder E is provided with a hub, $e$, which journals in a bearing, F.

F represents a collar-bearing, to which are attached arms or wings G G'. Wing G slides in a groove, I, in the top of cup B. This groove serves as a guide for wing G, which slides therein as the wheel D slides in and out of the cup. The wings or ribs G G', as they move in and out, regulate the size of the grain-channel in the seed-cup.

$f$ represents a washer, and P pins for securing the seed-wheel and its parts to the axle.

H represents a register-plate, provided with slots $h\,h$, through which slots pass screws L, securing it to the grain-box A, and slot $s^2$, for the passage of bolt S.

M represents an indicator-plate attached to the seed-box immediately above and in connection with register-plate H, and having slot $s$ for the passage of bolt S.

N represents a lever pivoted at O to the seed-box A, having slot $s'$ for the passage of bolt S, and slot O', into which engages a lug, $r$, on the top of segmental lug R.

Q represents a grooved collar fastened to shaft C, and R a segmental lug rigidly attached or connected to lever N, and fitting into the groove of collar Q.

S represents a thumb-screw bolt passing through the slots $s\,s'\,s''$ made in the plates M and H and lever N. When the thumb-screw is loosened the lever N and plate H will slide to the right or left and move shaft C laterally, adjusting the seed-wheels D in any desired position in cups B.

The seed-wheel D being provided with two bearings, one on the end of the cylinder and one in the rose-washer in the side of the cup, these bearings are always as wide apart as the seed-cup, and keep the seed-wheels always in line, and prevent their binding in the cups, and avoid the use of a sleeve-bearing, and allow the cylinder E to revolve with the seed-wheel D, and prevent the clogging of the grain in the seed-cup when the grain-channel through the cup is reduced to the smallest size. This is a very important feature of my invention.

Having thus described my invention, what I claim is—

1. A seeding device composed substantially of a seed-cup, a rose-washer sustaining the said wheel in the side of the cup, a seed-wheel rigidly attached to a cylinder of lesser diameter supported in a collar-bearing on the shaft, having wings extending over the cylinder, forming cut-offs in the grain-channel, the seed-wheel, with its cylinder, collar-bearing, and wings, being attached to the shaft so as to move with it laterally, and the feed-wheel and cylinder revolving with the shaft, as herein set forth.

2. In a grain device having a series of seed-cups and a series of seed-wheels, the cylinder E, in combination with the wings G G' and collar-bearing F, for forming a bearing at one end of the seed-wheel, and moving laterally with the seed-wheel and shaft, substantially as herein set forth.

3. A seed-wheel composed of ribs and grooves D, revolving cylinder E, and wings G G', with the collar-bearing F, in combination with the seed-cup B B and grooves I I, substantially as herein set forth.

4. The seed-cup B, seed-wheel F, and cylinder E, having the rotating rose-washer bearing for supporting one end of the seed-wheel and the non-rotating collar-bearing at the outer end of the cylinder for supporting the seed-wheel at its two ends outside of the grain-channel in the seed-cup, substantially as herein shown and described.

In testimony whereof I have hereunto set my hand.

JOHN R. RUDE.

Witnesses:
WILLIAM M. CASTERLINE,
WM. W. KNOX.